United States Patent [19]

Ross

[11] Patent Number: 5,884,203
[45] Date of Patent: Mar. 16, 1999

[54] COMBINATION ACCELEROMETER AND HIGH FREQUENCY PRESSURE TRANSDUCER FOR CRASH SENSING

[75] Inventor: Mark A. Ross, Sierra Madre, Calif.

[73] Assignee: TRW Inc., Redondo Beach, Calif.

[21] Appl. No.: 212,082

[22] Filed: Mar. 14, 1994

[51] Int. Cl.⁶ .................................................. B60R 21/32
[52] U.S. Cl. .......................... 701/45; 701/46; 280/728.1; 280/734
[58] Field of Search ............................... 364/424.05, 460, 364/461, 484; 280/728.1, 734, 735; 180/232, 271, 274, 276; 340/430, 438; 318/560, 561

[56] References Cited

U.S. PATENT DOCUMENTS

| | | | |
|---|---|---|---|
| 3,870,894 | 3/1975 | Brede et al. | 307/9 |
| 3,911,391 | 10/1975 | Held et al. | 340/52 H |
| 4,346,914 | 8/1982 | Livers et al. | 280/735 |
| 4,497,025 | 1/1985 | Hannoyer | 364/424.05 |
| 4,842,301 | 6/1989 | Feldmaier | 280/735 |
| 4,975,850 | 12/1990 | Diller | 364/424.05 |
| 4,979,763 | 12/1990 | Blackburn | 280/735 |
| 4,994,972 | 2/1991 | Diller | 364/424.05 |
| 5,034,891 | 7/1991 | Blackburn et al. | 364/424.05 |
| 5,036,467 | 7/1991 | Blackburn et al. | 364/424.05 |
| 5,040,118 | 8/1991 | Diller | 364/424.05 |
| 5,065,322 | 11/1991 | Mazur et al. | 364/424.05 |
| 5,073,860 | 12/1991 | Blackburn et al. | 364/424.05 |
| 5,109,341 | 4/1992 | Blackburn et al. | 364/424.05 |
| 5,145,208 | 9/1992 | Hoagland et al. | 280/734 |
| 5,189,311 | 2/1993 | Moriyama et al. | 307/10.1 |

FOREIGN PATENT DOCUMENTS

| | | |
|---|---|---|
| 0305654 | 3/1989 | European Pat. Off. . |
| 2207831 | 7/1991 | Germany . |
| 4218030 | 12/1993 | Germany . |
| 4220270 | 12/1993 | Germany . |

Primary Examiner—Tan Q. Nguyen
Attorney, Agent, or Firm—Michael S. Yatsko

[57] ABSTRACT

Passenger restraint system including a crash sensor for deploying an air bag associated with a vehicle during a crash event. The crash sensor includes a low frequency accelerometer circuit and a high frequency pressure transducer circuit. The low frequency accelerometer circuit senses low frequency signals from the deceleration of the vehicle as a result of the crash event, and the high frequency transducer circuit senses high frequency signals from the deformation of metal components as a result of the crash event. The combination of the high frequency signals and the low frequency signals provides an accurate indication for deployment of the air bag.

19 Claims, 2 Drawing Sheets

COMBINATION ACCELEROMETER AND HIGH FREQUENCY PRESSURE TRANSDUCER FOR CRASH SENSING

BACKGROUND OF THE INVENTION

1. Field of the Invention

This invention relates generally to a passenger restraint system for a vehicle and, more particularly, to a passenger restraint system for a vehicle incorporating a combination of a low frequency accelerometer and high frequency pressure transducers for sensing a crash event in order to deploy an air bag associated with the vehicle.

2. Discussion of the Related Art

Many vehicles are equipped with passenger restraint systems incorporating an air bag for protecting vehicle passengers in the event of a crash. In order to deploy the air bag at the proper time, it is known in the art to employ specialized sensors and associated circuitry for detecting the crash event so as to release the air bag at the appropriate time. In order to be effective, the passenger restraint system must be able to separate crash events which would require deployment of the air bag, and those crash events in which deployment of the air bag would be unnecessary or undesirable. For example, for a side or rear-end collision, air bag deployment would provide no benefit to the passenger. Further, it would not be desirable to deploy the air bag for low intensity front-end collisions.

The most widely used sensor for detecting crash events for deploying an air bag is an accelerometer. An accelerometer used in this manner is generally a low frequency sensor which detects rapid deceleration in the speed of the vehicle. Accelerometers have been known to be very effective in detecting a front-end impact for appropriately releasing the air bag, and further, have been effective in preventing the air bag from being deployed during side or rear-end impacts when the air bag would be ineffective. Additionally, accelerometers of this type have been shown to be very effective in deploying the air bag at a desired level of impact violence, so as to prevent the air bag from being deployed in low impact situations when it wouldn't be required.

Many known passenger restraint systems offer different modifications to the above described general principle. U.S. Pat. No. 4,842,301 issued to Feldmaier discloses a crash sensing system for detecting a crash event and for deploying an air bag during an event of sufficient magnitude. Specifically, the crash sensing system includes two acoustic sensors positioned near the front of each side rail of the vehicle. The sensors generate a signal in response to acoustic vibrations due to the deformation of metal components during a front-end crash. The generated signal is filtered and passed through an envelope detector such that if the signal exceeds a predetermined reference amplitude for a predetermined time, the air bag will be deployed.

Other related patents include U.S. Pat. Nos. 5,109,341; 5,073,860; 5,065,322; 5,036,467; and 4,975,850. Each of these patents includes a system for deploying an air bag upon detection of a crash event. These systems each include an accelerometer for providing detection of rapid deceleration of the vehicle during the crash event.

In order for the prior art accelerometers to provide a desirable level of sensing, it has been shown to locate one or more accelerometers or comparable sensing devices in the crush zone of the vehicle. In this configuration, the sensing device(s) or accelerometer(s) is (are) separated from the other components of the passenger restraint system, such as the passenger restraint diagnostic unit and air bag firing capacitors. These components are generally located proximate to the air bag. It is thought to be desirable to locate the accelerometer or sensing device in the passenger compartment of the vehicle so that the entire restraint system can be included as a single assembly. This concept enables the cost of the system to be reduced, as well as the life of the system to be increased. Under these circumstances, accelerometers would be isolated from the crush zone.

In the prior art systems, if the accelerometers were located in the passenger compartment, it is likely that, for certain types of crash events, the accelerometer may develop the appropriate impact signal at a time during the crash event which would cause the air bag to be deployed too late. Therefore, it would not be desirable to include the accelerometer of the prior art systems as part of a single assembly within the passenger compartment of the vehicle. It may be possible, in some cases, to improve the impact signal by redesigning the frontal structure and frame rails of the vehicle in question, but the expense to the vehicle manufacturer would be substantial. This also precludes the use of a single-point assembly in many existent vehicle models.

Other types of sensors can be used to provide an indication of a crash event. One type of sensor is a high frequency pressure transducer for sensing vibrations caused by metal being deformed. A high frequency pressure transducer is capable of providing a sufficiently fast crash indication signal while being located within the passenger compartment. Although a high frequency pressure transducer can detect high frequency signals developed during the crash event to give an adequate earlier indication of crash severity while being located in the passenger compartment, a transducer of this type cannot provide adequate directional information of the crash event. Therefore, this type of sensor may deploy the air bag during rear-end or side crash events when the air bag is not required. Consequently, in order to detect high frequency signals as an indication of crash severity, one may give up directional information obtainable from low frequency sensors.

It may also be shown that a crash into a barrier will cause the barrier itself to generate high frequency vibrations without substantially slowing the vehicle. These vibrations could be transmitted through the frame rails of the vehicle to a high frequency sensor located in the passenger compartment of the vehicle. In this case, a sensor depending solely on the high frequency vibrations to make its crash violence determination might be fooled into determining the crash event to be more severe than it actually is.

What is needed then is a crash sensor which is configured within the passenger compartment of a vehicle and can detect high frequency signals indicative of crash intensity and low frequency signals indicative of crash direction and overall vehicle deceleration. It is therefore an object of the present invention to provide such a crash sensor.

SUMMARY OF THE INVENTION

In accordance with the teachings of the present invention, a passenger restraint system is disclosed which includes a sensing device that combines a low frequency accelerometer and a high frequency sensor to provide a sensing system capable of giving early indication of crash severity, plus reliable indication of crash direction and initial velocity change. The high frequency sensing circuit provides a signal when front-end members of the vehicle are deformed past their elastic limits. Additionally, the low frequency accelerometer provides a signal upon deceleration of the vehicle.

The low frequency signal developed by the accelerometer which reliably indicates crash direction and initial velocity change would precede a low frequency accelerometer signal which would reliably estimate crash severity. Therefore, a sensor using the combination of low and high frequency sensors would make a reliable estimate of crash severity much quicker than a sensor that used a low frequency accelerometer only. This allows the sensor to be housed within the passenger compartment of the vehicle, and still provide reliable deployment of an air bag.

In one particular embodiment, the high frequency sensing circuit includes a series of high frequency pressure transducers and associated band pass filters. Each of the band pass filters provides a frequency limited signal to an analog-to-digital converter so that the intensity of different types of crash events having different frequency distributions can be reliably detected. Additionally, a signal from the accelerometer is also applied to the analog-to-digital converter. The output of the analog-to-digital converter is applied to a microprocessor which provides an output signal to an air bag firing circuit upon determination of a signal of appropriate intensity and direction. In an alternate embodiment, the outputs from the band pass filters are applied to a high speed logic circuit in order to create a simpler output signal to the microprocessor.

Additional objects, advantages, and features of the present invention will become apparent from the following description and appended claims taken in conjunction with the accompanying drawings.

DETAILED DESCRIPTION OF THE PREFERRED EMBODIMENTS

The following discussion of the preferred embodiments concerning a passenger restraint system including a sensing system for sensing crash severity and direction is merely exemplary in nature and is in no way intended to limit the invention or its application or uses.

Figure 1:
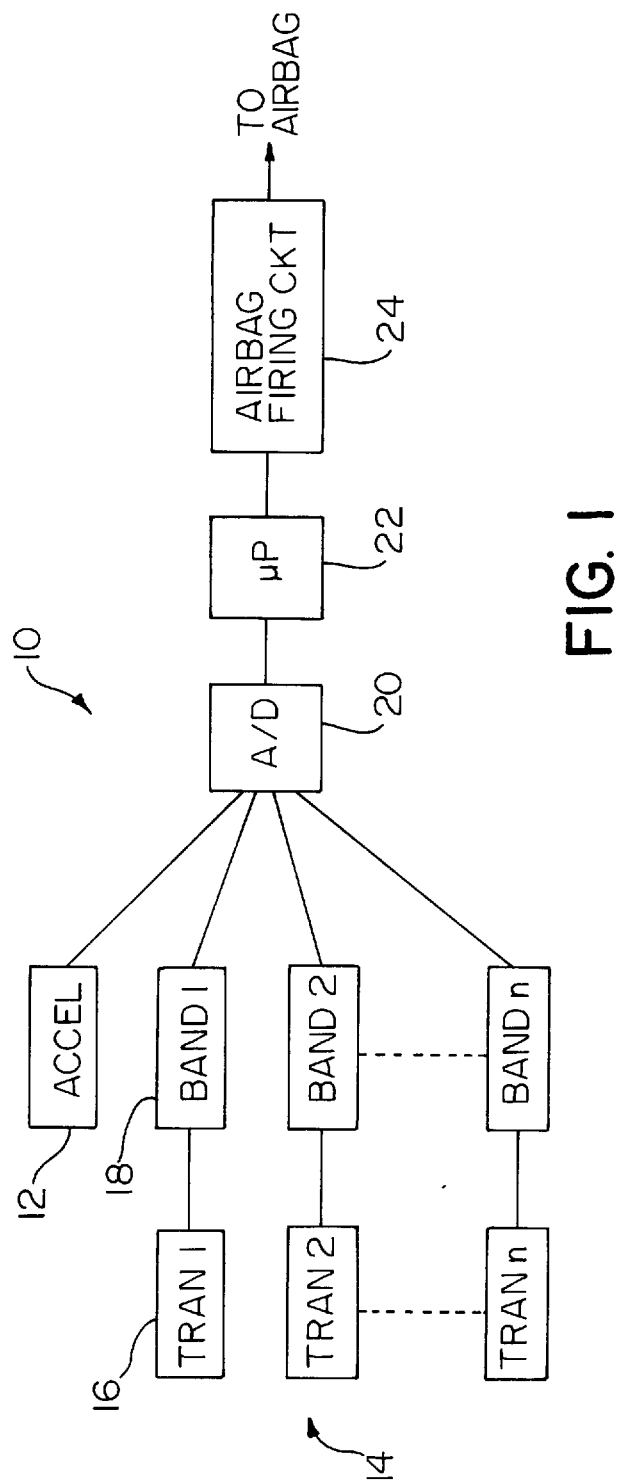
FIG. 1 is a block schematic diagram showing a passenger restraint system according to one preferred embodiment of the present invention.

Turning to FIG. 1, a block schematic diagram of a passenger restraint system 10 for a vehicle (not shown), according to a preferred embodiment of the present invention, is shown. The system 10 is of the type which can be configured as a single assembly within a housing positioned in the passenger compartment of the vehicle proximate to an air bag (not shown) associated with the vehicle, and still provide reliable deployment of the air bag with respect to crash intensity and direction. Passenger restraint systems which include an air bag and associated deployment mechanisms are well known in the art, and therefore the specifics of how an air bag is stored and deployed during a crash event need not be discussed.

The passenger restraint system 10 includes a low frequency accelerometer circuit 12 for sensing deceleration of the vehicle. The accelerometer circuit 12 may include a piezoresistive, piezocapacitive or capacitive device which is capable of detecting frequencies within the range of 0 to 2000 Hz as a result of vehicle deceleration during a crash event. Accelerometers of these types are well known in the art, and thus, need not be discussed in detail here.

The system 10 also includes a high frequency sensing circuit 14. The sensing circuit 14 includes a series of high frequency pressure transducers 16 for sensing high frequency signals, typically above 50,000 Hz, which are generally generated as a result of metal being deformed during a crash event. Each high frequency transducer 16 includes a band pass filter 18 such that each transducer 16 is limited to outputting a certain range of frequencies for more accurate indication of crash severity. More particularly, the high frequency pressure transducers 16 provide an indication of a crash event in any of a predetermined number of different frequency bands such that different types of crash events can be assessed with respect to their severity even though they may generate different ranges of frequency signals. For example, a vehicle collision with a pole will generate a different frequency distribution than a vehicle collision with a barrier. Additionally, the collision with the barrier may be of a greater severity at a lower speed than the collision with the pole. Therefore, a lesser threshold for deploying the air bag may be required for a crash event with a pole, as opposed to a crash event with a barrier. It should be understood, however, that a single high frequency pressure transducer can be adequately utilized without departing from the scope of the invention. The output of a single high frequency pressure transducer can be applied to multiple filters, as would be well understood in the art.

An output of each of the band pass filters 18 and the accelerometer circuit 12 is applied to an analog-to-digital converter 20. The analog-to-digital 20 converts analog signals from the accelerometer circuit 12 and the high frequency transducers 16 to digital signals appropriate for processing by a microprocessor 22. The microprocessor 22 receives signals from the analog-to-digital converter 20 and determines if the signals are indicative of an event that is violent enough to warrant deployment of the air bag. Upon reaching this determination, the microprocessor 22 outputs an air bag firing signal to an air bag firing circuit 24 in order to deploy the air bag. The analog-to-digital converter 20, the microprocessor 22, and the air bag firing circuit 24 are conventional in nature, and thus, the operation of these devices would be well known to those skilled in the art. It will also be apparent to one skilled in the art that the functions performed by the analog-to-digital converter 20 can be accomplished by a single analog-to-digital converter using a multiplexer to switch between input channels or by separate analog-to-digital converters for each channel. Also, in many cases, the analog-to-digital converter may be incorporated within the microprocessor.

In the event of a crash, the high frequency pressure transducers 16 will detect deformation of structural members associated with the vehicle as these members are deformed past their elastic limits very quickly after initiation of the crash event. The high frequency transducers 16 will provide an analog signal to the band pass filters 18 which separate the signals into frequency ranges for each channel. The band pass filters provide the signals to the analog-to-digital converter 18, which in turn will provide a digital signal to the microprocessor 22 as an intensity for each frequency range. However, the microprocessor 22 may delay firing of the air bag until it receives a signal from the low frequency accelerometer circuit 12 providing directional information about the crash event. The accelerometer circuit 12 also provides an analog signal to the analog-to-digital converter 20 which in turn converts that analog signal to a digital signal appropriate to be deciphered by the microprocessor 22. The directional information in the signal read by the microprocessor 22 can be determined before the accelerometer circuit 12 provides a signal that reliably indicates a crash of sufficient violence to require deployment of the air bag. Therefore, the microprocessor 22 can provide a signal to the air bag firing circuit 24 to deploy the air bag quicker than could be available if just an accelerometer circuit was provided. It should also be noted that the high frequency sensing circuit 14 may be fooled into thinking a severe crash event has occurred, when in fact one has not occurred. For example, a vehicle may collide with a barrier and the barrier itself may generate high frequency vibrations without substantially slowing the vehicle. In this hypothetical case, the high frequency sensing circuit 14 may wrongly initiate a crash indication signal. However, since the accelerometer circuit 12 wouldn't provide indication of the slowing of the vehicle, the microprocessor 22 will know not to deploy the airbag.

Figure 2:
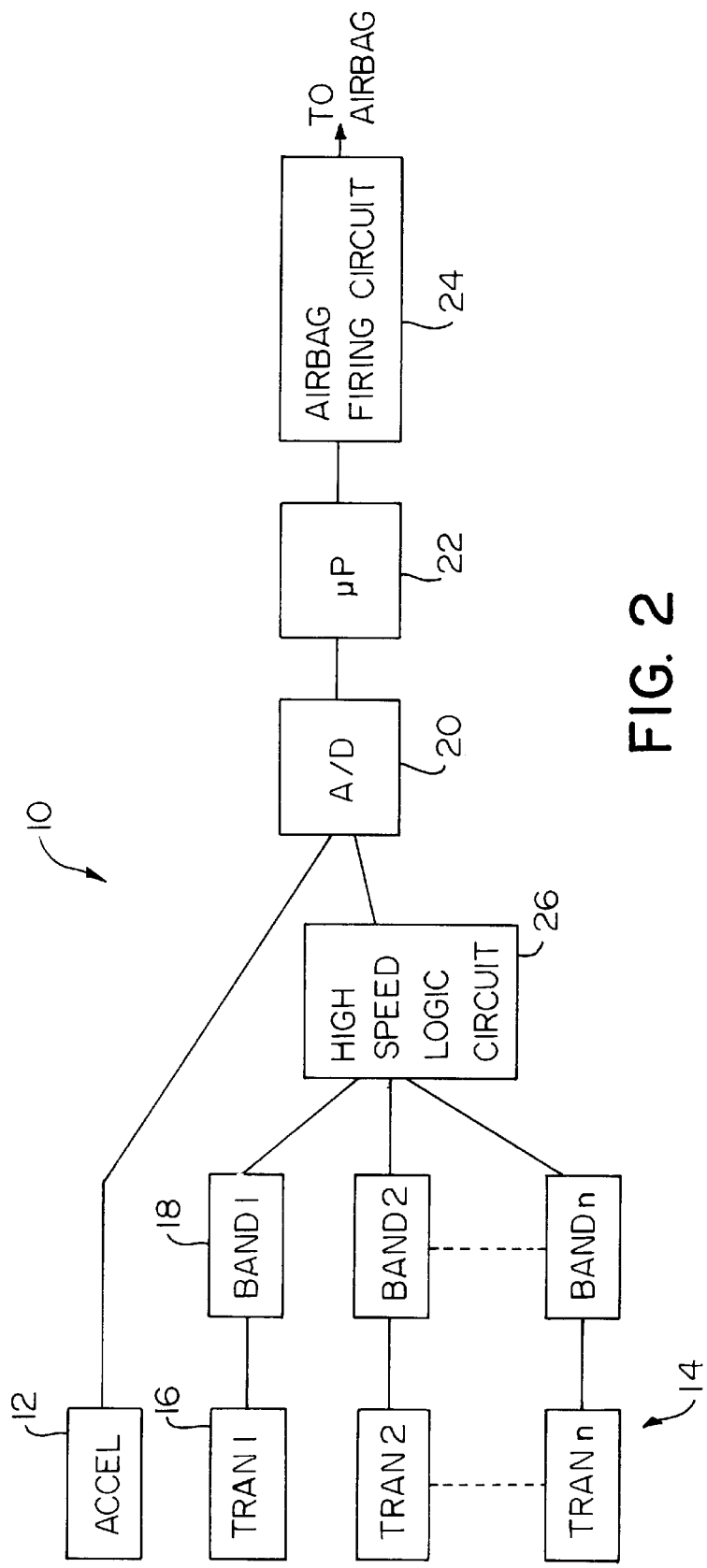
FIG. 2 is a block schematic diagram showing a passenger restraint system according to another preferred embodiment of the present invention.

Turning to FIG. 2, an alternate embodiment of the passenger restraint system 10, discussed above, is shown incorporating a high speed logic circuit 26. The high speed logic circuit 26 receives analog signals from the band pass filters 18. An output of the high speed logic circuit 26 is then applied to the analog-to-digital converter 20 along with the output of the accelerometer circuit 12. The primary purpose of the high speed logic circuit 26 is to gather essential information from the high frequency signals and create a simple output signal to be processed by the microprocessor 22. If the outputs of the logic circuit 26 are of a simple enough nature, these outputs can be fed directly to input ports on the microprocessor 22 without the need to go through the analog-to-digital converter 20.

Different applications of the high speed logic circuit 26 are available. The details of the high speed logic circuit 26 could, therefore, vary for the different vehicles for which the system 10 is associated. The high speed logic circuit 26 could apply a simple threshold level to each of the frequency ranges from the band pass filters 18. Such a concept would have application in that the high frequency logic circuit 26 would prevent a signal from being applied to the microprocessor 22 unless the crash event was of such a nature as to require deployment of the air bag. In another application, the high speed logic circuit 26 could output a signal that indicates what type of event is going on. This information could be used to adjust the threshold or other calculational parameters within the microprocessor 22. Further, the high speed logic circuit 26 could output each of the intensity levels for the different band pass filters 18 to be processed by the microprocessor 22.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A sensing device for use in a passenger restraint system that restrains a passenger within a vehicle during a crash event, said sensing device comprising:

a low frequency sensing circuit providing a signal of the crash event, said low frequency sensing circuit being responsive to low frequency signals generated as a result of deceleration of the vehicle during the crash event;

a high frequency sensing circuit providing a signal of the crash event, said high frequency sensing circuit being responsive to high frequency signals generated as a result of deformation of structural members of the vehicle during the crash event;

analyzing means for combining and analyzing the signal from the low frequency sensing circuit and the signal from the high frequency sensing circuit so as to provide an indication of whether to activate a passenger restraint device.

2. The sensing device according to claim 1 wherein the high frequency sensing circuit includes a plurality of pressure transducers and band pass filters, said pressure transducers being responsive to the deformation of the structural members, wherein each pressure transducer provides a signal indicative of the deformation of the structural members which is limited to a predetermined frequency range by a band pass filter.

3. The sensing device according to claim 1 wherein the low frequency sensing circuit is an accelerometer circuit that detects deceleration of the vehicle during the crash event.

4. The sensing device according to claim 3 wherein the accelerometer circuit includes a detector selected from the group consisting of piezoresistive, piezocapacitive and capacitive detectors.

5. The sensing device according to claim 1 wherein the analyzing means includes an analog-to-digital converter and a microprocessor, wherein the signal from the low frequency sensing circuit and the signal from the high frequency sensing circuit are applied to the analog-to-digital converter in order to convert the signal from the high frequency sensing circuit and the signal from the low frequency sensing circuit to a digital signal applicable to be processed by the microprocessor.

6. The sensing device according to claim 1 further comprising a logic circuit, said logic circuit being responsive to the signal from the high frequency sensing circuit and providing information of the type of crash event prior to the signal from the high frequency sensing circuit being applied to the analyzing means.

7. A passenger restraint system for deploying an air bag within a vehicle during a crash event, said system comprising:

a low frequency sensing circuit being responsive to deceleration of the vehicle during the crash event, said low frequency sensing circuit providing a signal indicative of the deceleration;

a high frequency sensing circuit for sensing high frequency signals as a result of deformation of structural members of the vehicle during the crash event, said high frequency sensing circuit providing a signal indicative of the deformation of the structural members;

analyzing means for combining and analyzing the signal from the low frequency sensing circuit and the signal from the high frequency sensing circuit, wherein the analyzing means combines the signals to provide an indication of whether to deploy the air bag; and an air bag firing circuit responsive to an air bag deploying signal from the analyzing means, said air bag firing circuit deploying the air bag upon receiving the airbag deploying signal from the analyzer means.

8. The passenger restraint system according to claim 7 wherein the high frequency sensing circuit includes a plurality of pressure transducers and band pass filters, said pressure transducers being responsive to the deformation of the structural members, wherein each pressure transducer provides a signal indicative of the deformation of the structural members that is limited to a predetermined frequency range by a band pass filter.

9. The passenger restraint system according to claim 7 further comprising a high speed logic circuit, said high speed logic circuit receiving the signal from the high frequency sensing circuit and providing an output signal indicative of the crash event.

10. The passenger restraint system according to claim 9 wherein the analyzing means in a microprocessor, said high speed logic circuit providing an output signal to the microprocessor depending on whether input signals from the band pass filters exceed a predetermined threshold.

11. The passenger restraint system according to claim 9 wherein the high frequency sensing circuit includes a plurality of separate frequency channels, and wherein the high speed logic circuit generates output signals indicative of intensity levels of the signals from the separate frequency channels.

12. The passenger restraint system according to claim 7 wherein the low frequency sensing circuit is an accelerometer circuit including a detector selected from the group consisting of piezoresistive, piezocapacitive and capacitive detectors.

13. The passenger restraint system according to claim 7 wherein the analyzing means includes an analog-to-digital converter and a microprocessor, wherein the signal from the low frequency sensing circuit and the signal from the high frequency sensing circuit are applied to the analog-to-digital converter in order to convert the signals to digital signals applicable to be processed by the microprocessor, said microprocessor controlling the air bag firing circuit.

14. A passenger restraint system for deploying an air bag within a vehicle during a crash event, said system comprising:

an accelerometer circuit, said accelerometer circuit being responsive to deceleration of the vehicle during the crash event, said accelerometer circuit providing a signal indicative of the deceleration;

a plurality of pressure transducers and band pass filters, each of the pressure transducers being responsive to high frequency signals during the crash event as a result of deformation of structural members that are indicative of crash intensity, wherein the band pass filters limit output signals from the pressure transducers to a predetermined frequency range in order to separate different types of crash events;

a microprocessor being responsive to signals from the accelerometer circuit and the transducers, said microprocessor providing an air bag control signal; and an air bag firing circuit, said air bag firing circuit being responsive to the air bag control signal and deploying the air bag upon receipt of the control signal from the microprocessor.

15. The passenger restraint system according to claim 14 further comprising a logic circuit, said logic circuit being responsive to signals from the band pass filters and outputting a signal to the microprocessor.

16. The passenger restraint system according to claim 15 wherein the logic circuit outputs the intensity levels for each of the band pass filters.

17. The passenger restraint system according to claim 14 further comprising an analog-to-digital converter, said analog-to-digital converter being responsive to the signal from the accelerometer circuit and the signals from the band pass filters and converting the signals from the accelerometer and the band pass filters to comparable digital signals, said analog-to-digital converter outputting the digital signals to the microprocessor.

18. The passenger restraint system according to claim 17 further comprising a logic circuit, said logic circuit accepting the signals from the band pass filters and outputting signals indicative of the signals from the band pass filters to the microprocessor.

19. The passenger restraint system according to claim 14 wherein the accelerometer circuit includes a detector selected from the group consisting of piezoresistive piezocapacitive and capacitive detectors.

* * * * *